: 3,380,863
Patented Apr. 30, 1968

3,380,863
METHOD OF ETCHING WITH A STRIPPABLE MASKANT
Kenneth J. Silberberg, Altadena, Calif., assignor to Purex Corporation Ltd., Lakewood, Calif., a corporation of California
No Drawing. Filed Mar. 31, 1966, Ser. No. 538,983
7 Claims. (Cl. 156—12)

ABSTRACT OF THE DISCLOSURE

The requirements of a maskant for successful chemical etching, namely adhesiveness, chemical resistance, strippability and freedom from "cob-webbing" are found to be present to an outstanding degree in block copolymers of polystyrene and polybutadiene having styrene/butadiene ratios of 40/60 to 20/80 and also a minor proportion of an $\alpha$-methyl styrene polymer.

---

This invention relates to chemical etching and, more particularly, to improved maskant composition for use in chemical etching. The invention also relates to improved chemical etching method resulting from the use of such maskant composition.

In chemical etching, material or metal is removed from a surface of a metal article by subjection thereof to an etching solution to obtain a part having a desired structural or ornamental configuration. In many instances, in order to produce a desired etch configuration on an article in a practical manner, it is necessary to mask certain portions of the surface of the article so as to prevent contact of such surface portions with the etching solution.

A substantial number of organic compounds and resins have been employed as etch maskants by the prior art. These include vinyls, epoxy resins, silicones, polyamides, polyethylenes, and other chemically resistant polymers. These materials, however, are unsatisfactory for a number of reasons, such as "cob-webbing" or the formation of thin strands of maskant composition between the application equipment and the part, even when said composition has proper solids content, failure of the mask formed by such composition to withstand the environment of the etching solution, failure of the mask to adhere sufficiently to the substrate or surface of the part, difficulty in removing the mask after completion of the etching process, necessity for use of a primer prior to application of the mask, necessity for exercising extreme care in cleaning prior to the application of the mask, limited pot life of the maskant composition after addition of the accelerator (in the case of those masks requiring an accelerator), necessity of excessive heat treatment in order to complete the curing cycle, necessity for using masking tape and non-reproducibility with respect to general characteristics affecting the operation of the mask.

The most serious problems encountered in the use of prior maskants are (1) insufficient adhesion of the mask to the part, (2) insufficient resistance of the mask to the etching solution especially at the edges of the mask, permitting undesirable penetration of the solution between the mask and underlying substrate, (3) inability to be readily strippable from the part after etching, and (4) excessive "cob-webbing" which often accompanies spraying of the maskant composition onto the part.

Further disadvantages of known maskant compositions are the problems they present in achieving adequate chemical resistance and mechanical toughness. Generally in elastomer based maskants, which are preferred over other materials for minimizing problems noted above, toughness is brought up to required levels by "curing" or advancing elastomer molecular weight through chemical reaction secured between elastomer molecules through use of accelerators or cure agents such as sulfur or sulfur compounds and amine compounds. Nonelastomer based maskant compositions are generally too brittle or otherwise mechanically undesirable for broad spectrum use.

One object of this invention is the provision of novel plastic coating compositions forming coatings resistant to chemical attack.

Another object of this invention is the provision of novel maskant compositions avoiding the above noted difficulties of the prior art.

A further object of the invention is to provide a metal article having applied to at least a portion of a surface thereof, a novel maskant composition for protection of such surface portion from attack by an etching solution during etching of said article.

A still further object is to provide a novel maskant composition which on application to the surface of a part to be etched forms a mask or plastic coating preventing corrosion of the surface portion covered by said mask by the etching solution, such mask being resistant to attack by the etching solution particularly at the edges of the mask, the mask in addition being uniformly adherent to the substrate before and after etching yet readily cuttable and strippable from the substrate both prior to and following etching.

Yet another object is the provision of relatively inexpensive maskant compositions and coatings for masking parts to be subjected to chemical etching and the coated article.

Another object is to provide a novel matrix for a maskant composition wherein the desirable properties of elastomer and polymer maskants are retained and their disadvantages overcome.

Other objects and advantages will be apparent from the following description of the invention.

It has now been found that the limitations and disadvantages of prior art maskants are overcome by the use in chemical etching of the novel maskant compositions hereof which have a matrix consisting essentially of (1) a block copolymer composed of styrene and butadiene in the ratio of 40:60 to 20:80 having a resilience of at least 40% in the uncured state and having at least one polystyrene block of a length sufficient for the block copolymer to exhibit a glass transition temperature above about 50° C. and a polybutadiene block of a length sufficient for the block copolymer to exhibit a glass transition temperature below about −50° C. and a minor proportion of an $\alpha$-methyl styrene polymer.

The term "matrix" herein refers to the material within and throughout which other maskant ingredients such as fillers if any, are distributed.

By the use of styrene-butadiene block copolymers, first disclosed herein, as distinguished from random styrene-butadiene copolymers heretofore known, e.g. U.S.P. 3,227,589 to Deutsch manifold benefits are realized. First, because these block copolymers have the chemical resistance and strength typical of the nonelastomer portion, i.e. the polystyrene block and the flexibility and adhesion of the elastomer portion, i.e. the polybutadiene block in one matrix material there is provided the critical properties needed in a maskant. Secondly, because these strength properties are achieved without the use of cure agents or accelerators, such as are taught in the prior art, block copolymers result in savings in raw material costs, in material waste due to premature cure, in blending costs, of cure equipment and time and in overall greater uniformity and predictability of results. Therefore, although a cure agent can be present, adequate levels of tensile strength are present for presently known uses of maskants in the "uncured," raw or gum stock block copolymer taught herein.

Block copolymers are distinguished in molecular structure from random copolymers. In the latter the two monomer species are in alternating relationship roughly proportional to their ratio in the polymerization system and their reaction rate. In block copolymers on the other hand one monomer species then the other is polymerized so that long homogeneous chains of one monomer species are formed joined to homogeneous chains of the other monomer species. This type of copolymer structure in general is detectable by the presence of two distinct glass transition temperatures for the copolymer, one for each species which approximates the glass transition temperature for the polymer of that monomer alone, whereas an alternating or random copolymer shows but one "compromise" glass transition temperature. For example the block copolymer employed in the examples herein is composed of blocks of polystyrene and polybutadiene and exhibits a glass transition temperature at −84° C. which is closely approximate the published glass transition temperature of polybutadiene homopolymer and a second glass transition temperature at +98° C. which is closely approximate the published glass transition temperature of polystyrene homopolymer.

As used herein the term "glass transition temperature" refers to that temperature at which molecular movement in a material is so slow that the material appears hard or glasslike, or changes from a soft to a hard, brittle material. Any test measuring the temperature range at which a noncrystalizing liquid becomes brittle will give a good indication of glass transition temperature. The test described by L. N. Kattas in a paper, "An Evaluation of the Torsion Pendulum in the Accelerated Environmental Testing of Paint Films," presented at the ACS Division of Organic Coatings and Plastics Chemistry, March 1966, provides such a measure.

Another distinguishing characteristic of block copolymers is their resilience or "snap" in the uncured state. The block copolymers, without cure, exhibit a resilience, measured according to ASTM D-945, greater than 40% and often 50% and higher. Random copolymers, on the other hand, are quite low in resilience when in the uncured or "gum stock" state, being on the order of only 20% (e.g. SBR 1500 styrene-butadiene random copolymer).

The combination of resilience and chemical resistance afforded by the block copolymers herein makes them superior materials for use in maskants where cohesive strength, to enable peeling from the substrate, is as important as resistance to etchant chemicals in etching solutions. It has been found that the chemical resistance is considerably enhanced by the inclusion of a minor proportion, generally at least two parts and preferably between 5 and 20 parts by weight, per 100 parts by weight of the block copolymer of a polymer of α-methyl styrene. This polymer preferably has a molecular weight between 5,000 and lower and 60,000 and higher but this is not critical.

The mask formed by the maskant compositions of the invention has the characteristics of (a) being impermeable to the etching solutions and (b) adhering at a controlled, or controllable, degree of adhesion sufficient to cause it to adhere to the substrate under the severe conditions of the etching bath; namely, at elevated temperature and/or high chemical activity, but which is nevertheless readily removable by hand stripping both before and after etching, yet having, on portions hand stripped prior to etching, adequate adherence to the part surface at the cut edges of the mask. The invention maskant compositions also possess the advantages of being applicable to the part surface without "cob-webbing," and of being highly inert to chemical etching solutions.

However, the strippable nature of the mask and its chemical resistance to attack by etching solutions, are outstanding properties of the mask produced herein, making such mask particularly adaptable and useful in connection with metal removal by means of etching solutions so as to form structural parts which may have relatively complex configurations. The strippable nature of this mask makes it possible to spray, dip, or brush a coating of the novel maskant composition on a substrate such as an aluminum alloy, and without curing the composition, the mask may be stripped from the substrate by cutting with a sharp knife or similar instrument and pulling the cut mask from the surface by hand, either before or after etching. This property is of advantage since it is possible to coat an entire surface with the mask and then remove the mask from the surface in stages following a plurality of successive etching operations, in accordance with a predetermined design. The area which is left masked at each stage is thus defined by sharp lines which are in exact accordance with the desired design. Furthermore, this new mask possesses adhesion such that the boundary between the masked and unmasked area is sharp and definitive even after completion of etching. It is not necessary to perform any additional operation to insure the adhesion of the mask at the boundary between the masked and unmasked areas. Also, employing the present maskant composition a design can be cut in the mask, the part etched to a desired amount, another design cut in the mask and etching continued. In this manner the mask makes it possible to prepare multiple cuts (or etch levels) by chemical etching without the necessity for completely demasking the part after each etching step and remasking to a new design. The saving in labor and expense is accordingly substantial. Further, the mask can be stripped by hand after completion of etching without resorting to the use of special demasking agents. However, the maskant composition is also removable by treatment with known demasking materials, should such an operation be desired.

It has been found that to obtain the advantages of the invention, the maskant composition must contain, as the matrix, 5%–25% preferably about 15% styrene-butadiene block copolymer having a styrene-butadiene ratio of from 40:60 to 20:80 and preferably about 34:66 to 28:72 and a minor proportion, generally at least 2 parts by weight based on the block copolymer and preferably 5 to 20 parts of a polymer of -methyl styrene, per hundred parts of block copolymer preferably having a molecular weight between 5,000 and 60,000. To this matrix there can be added other materials generally known to be useful in maskants for chemical etching. The balance of the composition is made up of organic solvent, e.g., from 50% to 90% by weight solvent. Useful solvents include aliphatic and aromatic hydrocarbons and their halogenated derivatives as well as esters. Specific solvents are aromatic hydrocarbons such as toluene, benzene and chlorinated aromatic hydrocarbons such as chlorobenzene, aliphatic hydrocarbons such as hexane, and aliphatic esters such as alkyl esters of lower carboxylic acids, e.g., butyl and amyl acetate.

As with maskant compositions heretofore known it is desirable to employ small amounts of phenolic resin, generally 0.25 to 10% by weight, based on the total composition, to control the specific degree of adhesion and peelability. Among phenolic resins, pheno-aldehyde resins and particularly alkylphenol such as nonylphenol formaldehyde resins are preferred. Used in conjunction with the phenolic resin is a small amount of metal oxide, preferably an alkaline earth metal oxide such as magnesium or zinc oxide in amounts of 0.025 to 1% by weight based on the total composition proportioned to the amount of phenolic resin employed.

A variety of fillers and extenders can also be employed to reduce cost and modify certain properties. For example, clays including organic, e.g., amine coated clays, carbon black, silicas and talc can be incorporated in the matrix.

Accelerators and cure agents are not required but can be used, as explained above. Typical useful accelerators and cure agents are described in U.S. Patent 3,079,352 to Atkins et al.

While the preparation of the block copolymer does not form a part of the present invention, it may be stated that there are several routes to their preparation. For example these block copolymers can be prepared by the use of lithium based initiators either in polar or nonpolar solvents dependent on the structure of the conjugated diene polymer blocks desired. The lithium based catalysts include lithium metal, alkyl lithiums and dilithiums with alkyl lithiums such as butyl lithium up to octyl and like alkyl lithiums being preferred. Polymerization is carried out by alternate feeding of styrene and butadiene monomer into the reaction system for a time and at a rate predetermined to provide the desired chain lengths of the two monomer species. Alternatively, preformed chains may be connected through a coupling reaction using a polyfunctional reagent such as a divinylstyrene.

Other, copolymerizable monomers can be incorporated in the styrene-butadiene block copolymers. In general, any vinyl unsaturated compound and conjugated diene can be incorporated in the block copolymer. For example in addition to polystyrene poly (vinyl) blocks can include polymers and copolymers of vinyl monomers such as vinyl arenes, e.g., vinyl toluene, vinyl xylene, ethyl vinyl benzene and vinyl naphthalene, vinyl pyridine, vinyl halides and vinyl carboaxylates, as well as acrylic monomers such as acrylonitrile, methacrylonitrile, esters of acrylic acids and the like. Poly (diene) blocks can be prepared from such conjugated dienes as isoprene, copolymers of styrene and butadiene and homologues thereof in addition to butadiene.

As stated above the block copolymers useful herein exhibit two distinct glass transition temperatures one above 50° C. and one below −50° C. Molecular weight of copolymer constituents sufficient to provide these glass transition values are in general a polystyrene block of at least 5,000 and preferably 15,000 to 100,000 and more and a polybutadiene block of at least 15,000 and preferably 25,000 to 150,000 and more.

The components of the maskant composition may be mixed or blended in any desired manner. At this point another advantage of the block copolymers based maskants is seen. With conventional elastomer based maskants it has been the practice in preparing the formulation to first break down the nerve tissue of the polymer by milling on suitable milling equipment, such as a Banbury mill. This milling step to insure proper dispersion of other maskant ingredients is not necessary with the elastomer matrix of the present invention since the block copolymer readily dissolves in, e.g., toluene affording an ease of mixing heretofore unknown in maskant preparation.

The composition can be made in varying viscosity ranges depending particularly on the amount of solvent incorporated in the formulation and the relative proportions of block polymer present, and the formulation can be stored or applied immediately to the surface of the article to be coated.

The above maskant composition can be applied to the substrate or metal surface in any suitable manner such as by spraying, brushing, flow coating, dipping, silk screening or any other conventional method for applying paints, lacquers or coatings. Although the novel maskant formulation is particularly suited for use on aluminum and its alloys as substrates, it is to be understood that such formulation can also be employed on other materials such as ferrous and other non-ferrous alloys to protect certain areas thereof from corrosion by etching solutions. Hence, the formulation is alkali resistant and is also resistant to non-oxidizing acids and to oxidizing acids when sufficiently dilute and at moderately elevated temperatures.

After application of the maskant composition to the substrate, the coating is dried to a continuous film. The part is then treated with an etching solution to cause the uncovered or exposed surfaces of the part to be etched or corroded by the etching solution to the desired depth and to form the desired etch pattern or configuration. Generally the masking composition is initially applied to the entire surface of the part, and the mask cut and hand stripped in accordance with a pre-selected design, to uncover or expose a surface portion of the part corresponding to said design. This can be accomplished with or without a template.

Various types of etching solutions, acidic or alkaline, can be employed for etching the exposed surface of the part adjacent the mask, depending on the nature of the metal to be etched. For example, in the case of aluminum and its alloys, which are alkali soluble, a hot aqueous etching solution is generally employed containing an alkali such as sodium or potassium hydroxide, trisodium phosphate, soda ash or the like, or mixtures thereof, preferably sodium hydroxide solution. Temperature is generally maintained in a range say from 100° F. to about boiling, although lower temperatures can be used. Generally the alkali concentration employed in such solutions ranges from 0.1 to 10 normal.

It is noteworthy that the mask using the present maskant compositions is highly resistant to alkaline and acid etchants, and forms a tight bond with the surface of the substrate substantially without the formation of capillary openings between the mask and the substrate or surface covered, especially at the edge of the mask. Due to this latter feature, etching solution is unable to pass into the interface between the substrate and the mask, and the mask is as resistant to etching solution along its edges as it is on its top surface. Another outstanding advantage of the mask is that while it is tightly adherent to the substrate and resistant to the etching solution as pointed out above, on completion of etching the mask is readily strippable from the substrate without the need for special stripping agents.

Particularly when aluminum or its alloys are to be coated with the maskant for etching, the metal surface is preferably cleaned. Ordinarily these metals contain a thin surface coating or film of oil with dirt particles in the oil film. Treatment of such surface with a mild alkaline cleaner such as a mixture of silicates, phosphates, soda ash, and wetting agents, removes this oil-dirt film. If the metal surface has grease thereon, this can be removed by treatment in a solvent such as tetrachloroethylene prior to treatment with the alkaline cleaner.

The following examples are illustrative of practice of the invention.

Example 1

All parts and percentages by weight herein unless otherwise stated.

A block copolymer of styrene and butadiene in a ratio of 31/69 exhibiting glass transition temperatures of −84° C. and +98° C. and having a resilience according to ASTM D–945 of about 60% was prepared by first polymerizing butadiene in the presence of butyl lithium catalyst in hexane solvent and, following substantially completely polymerizing the butadiene, styrene is added and substantially completely polymerized, and alternating in this manner until sufficient molecular weight is achieved.

The maskant matrix was prepared by dissolving 100 parts of the block copolymer in 450 parts of toluene and adding α-methyl styrene polymer (Amoco Resin #18) at 10 parts styrene polymer per 100 parts block copolymer. There was then added to the matrix about 14 parts of nonylphenol-formaldehyde resin (Bakelite CKR 1634)

and 1.4 parts of magnesium oxide per 100 parts of the block copolymer. Clay and talc were added in amounts of 75 and 40 parts, respectively per 100 parts of the block copolymer. The resulting mixture was used as a maskant composition. The absence of an accelerator is to be noted.

A 2024 aluminum alloy part was treated in noncorrosive alkaline cleaner and the part rinsed in water. The maskant composition consisting of the above mixture was coated onto the surface of the aluminum alloy part to form a coating about 0.0005 inch thick. A design was cut into the surface of the mask, and the cut portion of the mask was removed by hand stripping, leaving an exposed surface portion corresponding to the design to be etched.

The part was immersed, without mask cure, in an 11% caustic alkali solution at a temperature of 190° F. After etching of the part to the desired depth in the exposed areas, the part was removed from the solution. It was observed that the mask was still tightly bonded to the part surface and particularly that the edges of the mask were still clean and sharp with no noticeable deterioration thereof, and that such edges were tightly bonded to the substrate. The mask was then peeled from the substrate by first inserting a sharp edged instrument beneath an edge of the mask, the mask thereafter being readily peelable from the part surface.

Example 2

The same maskant composition is prepared as in Example 1, except 2 parts styrene polymer is used instead of 10%, the difference being made up by increasing the toluene. After application to the parts and treatment as set forth in Example 1, the resulting mask is found to have adequate chemical resistance and to be otherwise satisfactory.

Example 3

Using the procedures of Example 1, a maskant composition is prepared but using 20 parts of α-methyl styrene polymer. Adhesion to the aluminum part is satisfactory and chemical resistance outstanding.

Control 1.—Example 1 is duplicated but using a random styrene-butadiene copolymer SBR 1500, having approximately the same monomer ratio as the block copolymer used in Example 1, a resilience of 28% and a single glass transition temperature of −50° C. In addition to the ingredients recited in Example 1 there is added to a portion of the formulation, denoted "B," an accelerator, an aldehyde amine known as Accelerator 833. Formulation B was divided and a portion cured at 225–300° F. The other portion was air dried. All compositions are coated onto panels and tested for effectiveness. Only the cured portion of formulation B is equivalent in performance to the mask of Example 1 illustrating that the compositions of the present invention are equal to cured versions of the prior art even without cure agents or cure steps and superior to uncured formulations previously known.

Example 4

Example 1 is duplicated employing a 60/40 ratio block copolymer. Resilience is lessened to about 45% but chemical resistance is somewhat enhanced in chemical etching tests.

Example 5

Example 1 is duplicated employing an 80/20 ratio block copolymer. Adequate adhesion is realized with sufficient cohesive strength to permit peeling before and after immersion in the etching solution.

Example 6

Example 1 is duplicated but using various and etched metals as substrates including steel, stainless steel, copper and the like. Good adhesion and chemical resistance with easy peel is obtained from the maskant formulation.

Example 7

The formulation of Example 1 is modified by addition of aldehyde amine as an accelerator, Accelerator 833 (Du Pont) and curing for two hours at 225° F. No difference in performance over the Example 1 formulation, uncured, is noted, showing the lack of need of cure of the block copolymers taught herein.

I claim:
1. Method of chemically etching metal articles including the steps of masking selected portions of the surface of the metal article with an adherent layer of a maskant composition having a matrix consisting essentially of a block copolymer having a resilience of at least 40% in the uncured state composed of styrene and butadiene in the ratio of 40:60 to 20:80 and having at least one polystyrene block of a length sufficient for the block copolymer to exhibit a glass transistion temperature above about 50° C. and at least one polybutadiene block of a length sufficient for the block copolymer to exhibit a glass transition temperature below about −50° C. and 5 to 25 parts phenolic resin, at least 2 parts of α-methyl styrene polymer both per 100 parts by weight of said block copolymer and 0.025 to 1 part by weight metal oxide based on the total composition and subjecting the masked metal article to a chemical etching solution.

2. Method claimed in claim 1 wherein masking selected portions of the metal article surface includes the steps of applying to the surface a solution in a liquid hydrocarbon solvent of the maskant matrix containing from 5 to 25% by weight of said block copolymer, evaporating the solvent therefrom, scribing the desired pattern in the maskant and removing the scribed maskant in surface areas to be subjected to chemical etching solution.

3. Chemical etching maskant composition having a matrix consisting essentially of a styrene-butadiene block copolymer having a resilience in the uncured state of at least 40% and having at least one polystyrene block of a length sufficient for the copolymer to exhibit a glass transition temperature above about 50° C. and at least one polybutadiene block of a length sufficient for the copolymer to exhibit a glass transition temperature below about −50° C., and per 100 of the block copolymer 5 to 25 parts by weight of phenolic resin, and at least 2 parts by weight of a polymer of α-methyl styrene and based on the total composition 0.025 to 1 part by weight of metal oxide.

4. Maskant composition claimed in claim 3 wherein said polystyrene block has a minimum molecular weight of 5,000, said polybutadiene block has a minimum molecular weight of 15,000 and said α-methyl styrene polymer is present in an amount between 5 and 20 parts by weight per 100 of the block copolymer.

5. Maskant composition claimed in claim 4 wherein the molecular weight of the polystyrene block is between 15,000 and 100,000 and the molecular weight of the polybutadiene block is between 25,000 and 150,000 and the α-methyl styrene polymer is present in an amount of about 10 parts by weight per 100 of the block copolymer and has a molecular weight between 5,000 and 60,000.

6. Maskant composition claimed in claim 5 wherein there is present .5 to 2.5 parts by weight of alkaline earth metal oxide per 100 parts of block copolymer.

7. A solution of the maskant composition claimed in claim 5 in an amount of inert liquid hydrocarbon solvent sufficient to provide between 5 and 25% by weight block copolymer in the solution.

References Cited

UNITED STATES PATENTS

| | | | |
|---|---|---|---|
| 3,227,589 | 1/1966 | Deutsch | 156—13 |
| 3,239,478 | 3/1966 | Harlan | 260—880 |
| 3,251,905 | 5/1966 | Zelinski | 260—879 |

JACOB H. STEINBERG, *Primary Examiner.*